US009901903B1

(12) United States Patent
Abdullah et al.

(10) Patent No.: US 9,901,903 B1
(45) Date of Patent: Feb. 27, 2018

(54) BIOSYNTHESIZED MAGNETIC METAL NANOPARTICLES FOR OIL SPILL REMEDIATION

(71) Applicant: KING SAUD UNIVERSITY, Riyadh (SA)

(72) Inventors: Mahmood M. S. Abdullah, Riyadh (SA); Ayman M. Atta, Riyadh (SA); Hamad A. Al-Lohedan, Riyadh (SA); Hamad Z. Alkhathlan, Riyahd (SA); Merajuddin Khan, Riyadh (SA); Abdulrahman O. Ezzat, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/705,191

(22) Filed: Sep. 14, 2017

(51) Int. Cl.
*C02F 1/28* (2006.01)
*B01J 20/24* (2006.01)
*B01J 20/28* (2006.01)
*C02F 1/48* (2006.01)
*C02F 101/32* (2006.01)
(Continued)

(52) U.S. Cl.
CPC ........ *B01J 20/24* (2013.01); *B01J 20/28009* (2013.01); *C02F 1/286* (2013.01); *C02F 1/288* (2013.01); *C02F 1/488* (2013.01); *B01J 20/0225* (2013.01); *B01J 20/28007* (2013.01); *B01J 20/3202* (2013.01); *B01J 20/3217* (2013.01); *B01J 20/3242* (2013.01);
(Continued)

(58) Field of Classification Search
CPC .. C02F 1/286; C02F 1/288; C02F 1/40; C02F 1/488; C02F 2101/32; C02F 2103/007; C02F 2305/08; B01J 20/0225; B01J 20/24; B01J 20/28007; B01J 20/28009; B01J 20/3202; B01J 20/3217; B01J 20/3242
See application file for complete search history.

(56) References Cited

U.S. PATENT DOCUMENTS 8,057,682 B2   11/2011  Hoag
2017/0092396 A1*  3/2017  Moscatelli ............ H01F 1/0054

FOREIGN PATENT DOCUMENTS

EP        2804186 A1    11/2014

OTHER PUBLICATIONS

Nasrollahzadeh, "Anthemis Xylopoda Flowers Aqueous Extract Assisted In Situ Green Synthesis of Cu Nanoparticles Supported on Natural Natrolite Zeolite for N-formylation of Amines at Room Temperature under Environmentally Benign Reaction Conditions", Journal of Colloid and Interface Science (2015).
(Continued)

*Primary Examiner* — Matthew O Savage
(74) *Attorney, Agent, or Firm* — Richard C. Litman

(57) ABSTRACT

The biosynthesized magnetic metal nanoparticles for oil spill remediation are magnetic nanoparticles capped with an extract of *Anthemis pseudocotula*. The magnetic nanoparticles are formed by co-precipitation of ferric chloride hexahydrate and ferrous chloride tetrahydrate in an ethanol solution of the extract with the dropwise addition of ammonium hydroxide to raise the pH to between 8 and 11. The extract may be an extract of the aerial parts of *Anthemis pseudocotula* in a low polar extraction solvent, such as an n-alkane solvent or mono-di-, or trichloromethane. The extract is hydrophobic, improving dispersion of the magnetic nanoparticles in oil spills in seawater, resulting in 90% removal of oil for a 1:10 ratio of nanoparticles:oil by weight.

20 Claims, 7 Drawing Sheets

(51) Int. Cl.
*C02F 103/00* (2006.01)
*B01J 20/32* (2006.01)
*B01J 20/02* (2006.01)

(52) U.S. Cl.
CPC .... *C02F 2101/32* (2013.01); *C02F 2103/007* (2013.01); *C02F 2305/08* (2013.01)

(56) References Cited

OTHER PUBLICATIONS

Atta, "Synthesis and Application of Monodisperse Hydrophobic Magnetite Nanoparticles as an Oil Spill Collector Using an Ionic Liquid", RSC Advances (2017).

Atta, "Functionalization of Magnetite Nanoparticles as Oil Spill Collector," International Journal of Molecular Sciences (2015).

Atta, "Application of New Amphiphilic Ionic Liquid Based on Ethoxylated Octadecylammonium Tosylate as Demulsifier and Petroleum Crude Oil Spill Dispersant", Journal of Industrial and Engineering Chemistry (2016).

Abullah, "Synthesis and Application of Amphiphilic Ionic Liquid Based on Acrylate Copolymers as Demulsifier and Oil Spill Dispersant", Journal of Molecular Liquids (2016).

Abdullah, "Novel Magnetic Iron Oxide Nanoparticles Coated with Sulfonated Asphaltene as Crude Oil Spill Collectors", RSC Advances (2016).

Debs, "Magnetite nanoparticles and ferromagnetic bionanocomposites for crude oil removal from water", 5th International Conference on Sustainable Solid Waste Management (Jun. 2017), 2 pages, published at //uest.ntua.gr/athens2017/proceedings/pdfs/Athens2017_Debs_Cardona_da_Silva_Haddad_Carrilho_Labuto.pdf.

Saif, "Green Synthesis of Iron Nanoparticles and Their Environmental Applications and Implications", Nanomaterials, 6, 209 (2016), 26 pages.

* cited by examiner

BIOSYNTHESIZED MAGNETIC METAL NANOPARTICLES FOR OIL SPILL REMEDIATION

BACKGROUND

1. Field

The disclosure of the present patent application relates to nanotechnology, and particularly to biosynthesized magnetic metal nanoparticles for oil spill remediation made, in part, using extracts from *Anthemis pseudocotula* extracts.

2. Description of the Related Art

Oil spills are one of the most severe marine environmental disasters, causing water pollution through the release of several hazardous chemicals into the environment. Remediation of oil spills is expensive and time consuming. There are many remediation techniques that can be used to combat oil spills, including mechanical, bioremediation, and chemical techniques. Mechanical remediation is time consuming, expensive, and inefficient. Chemical remediation has become a common method due to its high efficiency and the ability to reuse the chemicals. In chemical remediation, different polymers and copolymers are used to absorb, disperse, or collect the oil. In addition to polymers, ionic liquids, polymer-doped ionic liquids, and surface-modified ionic liquids have been considered as potential chemical remediation components. However, the chemicals used in chemical remediation are thought by some to constitute a further source of marine pollution. This has led to a trend towards more restrictive environmental regulations, limiting the availability of chemical remediation as a tool for removal of oil spills.

Thus, biosynthesized metal magnetic nanoparticles for oil spill remediation solving the aforementioned problems are desired.

SUMMARY

The biosynthesized magnetic metal nanoparticles for oil spill remediation may be produced by mixing plant extracts with a metallic source material and a reducing agent. The plant extracts may act as capping and/or stabilizing agents for the magnetic metal nanoparticles.

In addition to forming metal nanoparticles, the plant extracts may act as a source of active compounds. The plant extracts may contain fatty acids, sesquiterpenoids, diterpenoids, phenolic compounds, coumarins, terpenoids, and other active compounds. These active compounds increase the extract's ability to form colloidal particles in crude oil, based upon interactions including the aromatic $\pi$-$\pi$* stacking force, hydrogen bonding, van der Waals forces, and electrostatic attractions. Use of these hydrophobic plant extracts as capping and/or stabilizing agents increases the resulting metal nanoparticles' dispersion in crude oil, rather than in seawater, and promotes their ability to collect oil from the surface of seawater.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
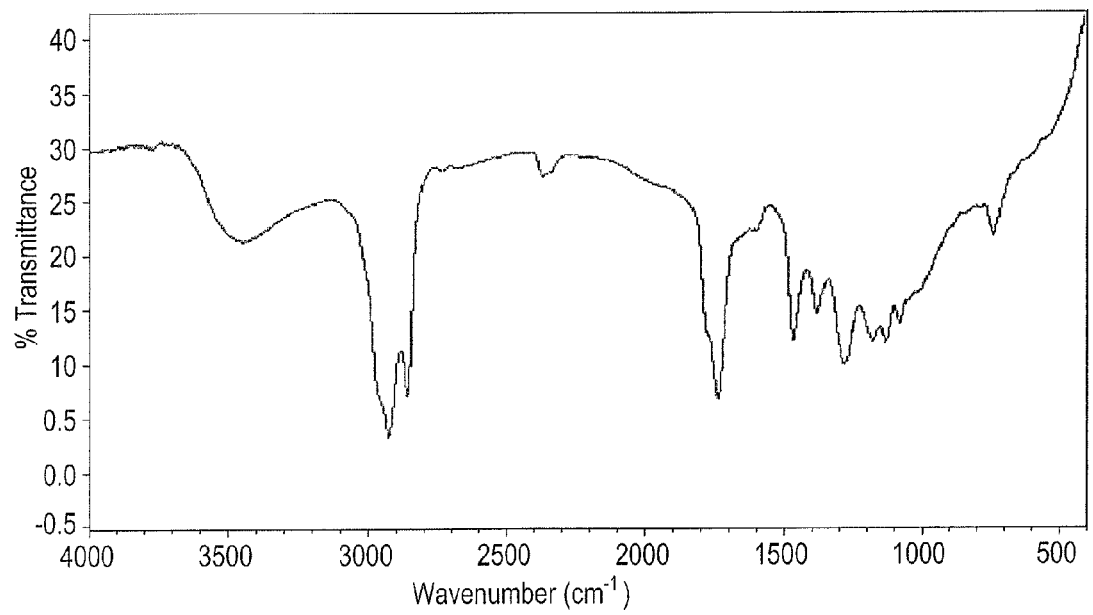
FIG. 1A is the Fourier transform infrared spectrum (FTIR) of the APA solution.
Figure 1B:
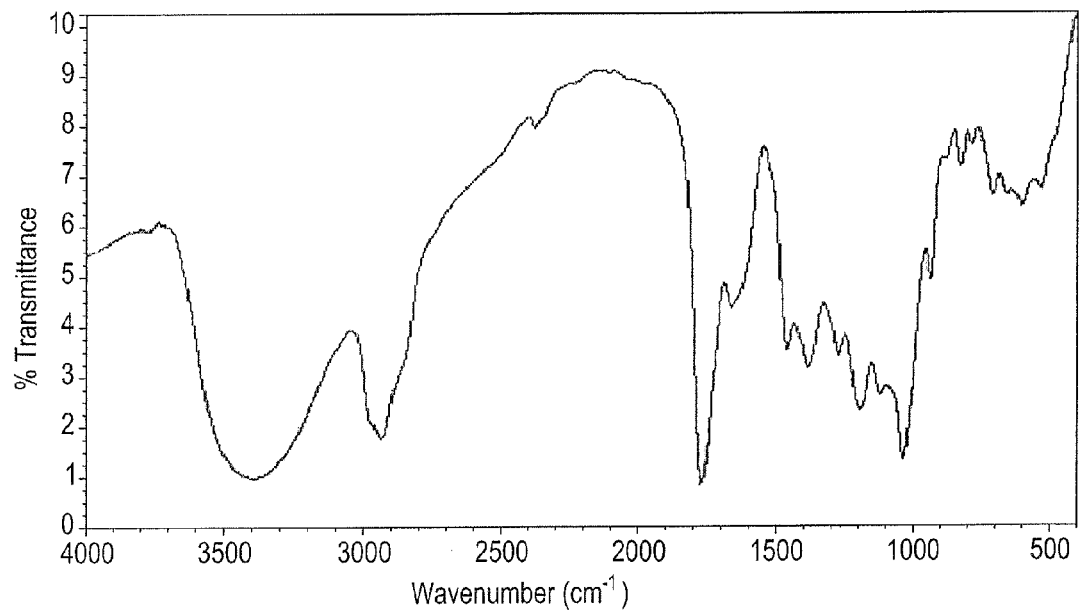
FIG. 1B is the FTIR spectrum of the APC solution.
Figure 1C:
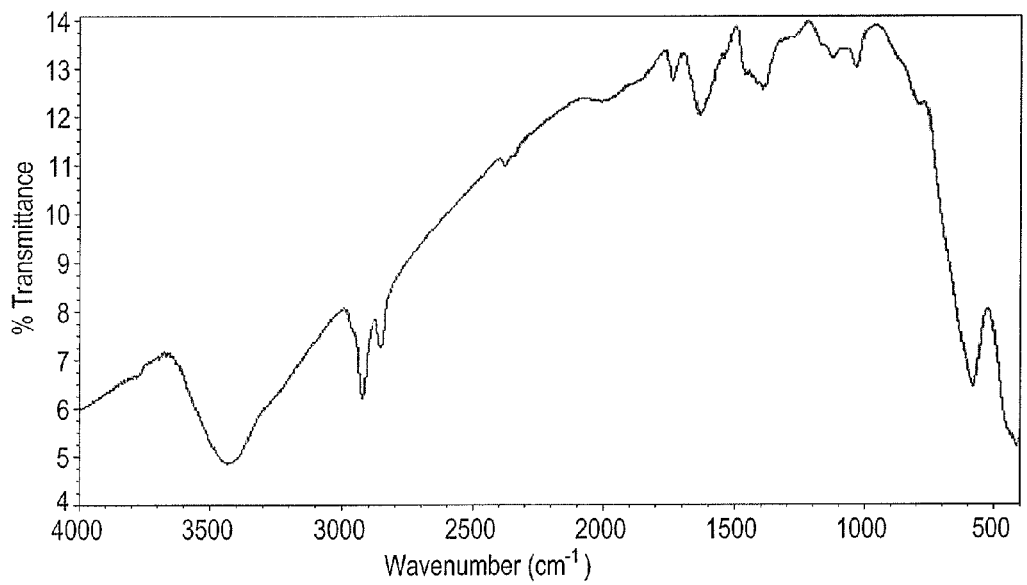
FIG. 1C is the FTIR spectrum of the APA-MNPs.
Figure 1D:
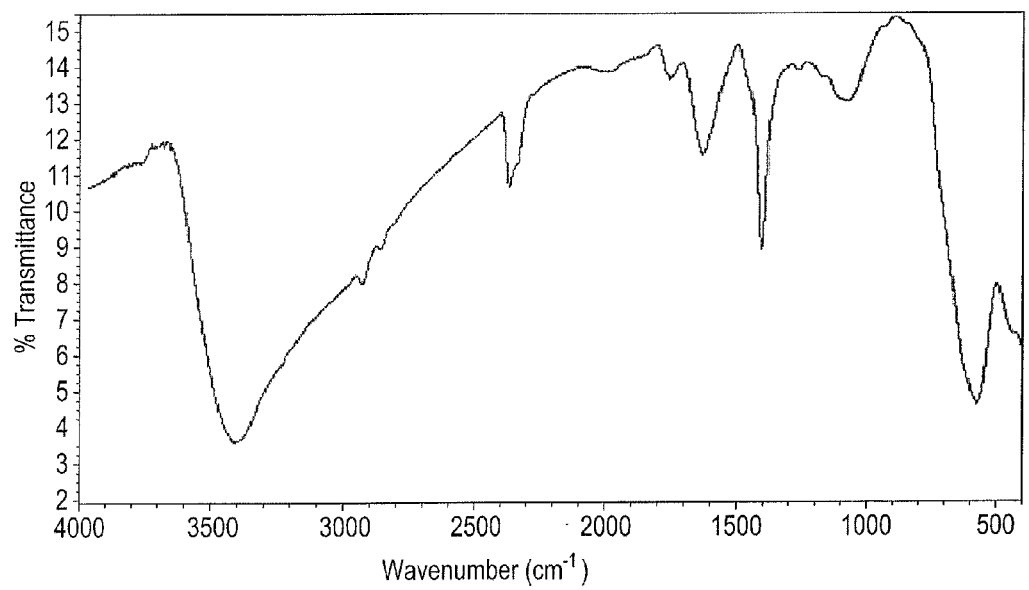
FIG. 1D is the FTIR spectrum of the APC-MNPs.

The biosynthesized magnetic metal nanoparticles for oil spill remediation may be produced by mixing plant extracts with a metallic source material and a reducing agent. The plant extracts may act as capping and/or stabilizing agents for the magnetic metal nanoparticles. The plant extracts may be hydrophobic extracts of *Anthemis pseudocotula* and the metallic source may be a source of iron.

In addition to forming metal nanoparticles, the plant extracts may act as a source of active compounds. The plant extracts may contain fatty acids, sesquiterpenoids, diterpenoids, phenolic compounds, coumarins, terpenoids, and other active compounds. These active compounds increase the extract's ability to form colloidal particles in crude oil, based upon interactions including the aromatic $\pi$-$\pi$* stacking force, hydrogen bonding, van der Waals forces, and electrostatic attractions. Use of these plant extracts as capping and/or stabilizing agents increases the resulting metal nanoparticles' dispersion in crude oil, rather than in seawater, and promotes their ability to collect oil from the surface of seawater.

The plant extracts used to biosynthesize magnetic metal nanoparticles for oil spill remediation may be drawn from any suitable plant. A wide variety of plants may be used, such as *Kappaphycus alvarezii, Carica papaya, Perilla frutescenes*, or *Anthemis pseudocotula*.

The plant extracts may be hydrophobic extracts. The use of hydrophobic extracts as capping/stabilizing agents may further improve the dispersion of the resulting metal nanoparticles in crude oil, rather than in seawater. The hydrophobic extracts may be produced by extraction using low polar solvents.

The plant extraction process may include harvesting, drying, extracting, and filtering steps. The harvesting step may include harvesting plant material from any portion of a plant. The drying process may include sun drying of the plant material. The extracting step may include multiple cycles of extraction, and may be performed using low polar solvents. The low polar solvents may include n-alkane and mono, di-, or tri-chloromethane. The filtering may be performed under reduced pressure and/or reduced temperature.

In one embodiment, the plant extract may be *Anthemis pseudocotula* extract using n-alkane as a low-polar solvent, producing *Anthemis pseudocotula* Alkane Extract (identified herein as APA).

In a further embodiment the plant extract may be *Anthemis pseudocotula* extract using chloromethane as a low-polar solvent, producing *Anthemis pseudocotula* Chloromethane Extract (designated herein as APC).

The metallic source material may be a source of any ferromagnetic, paramagnetic (or superparamagnetic), or ferrimagnetic metal. Examples of appropriate sources include sources of iron, including ferrous chloride tetrahydrate ($FeCl_2.4H_2O$) and ferric chloride hexahydrate ($FeCl_3.6H_2O$).

The magnetic metal nanoparticles may be biosynthesized by dissolving the metallic source material in water, stirring the resulting metallic source material solution with a plant extract, adding an ammonia solution to act as a reducing agent, adjusting the pH, incubating to ensure homogenization, and separating, washing and drying the resulting magnetic metal nanoparticles (MNPs). The pH may be adjusted to fall between about pH 8 and about pH 11. The incubation may be performed by stirring for about 1 hour to about 6 hours. The separation of the MNPs may be performed using an external magnetic field. The washing may be performed as a multi-step process, including one or more washes with ethanol and one or more washes with water. The drying may be performed at room temperature.

The APA and APC solutions and MNPs produced using APA (APA-MNPs) or APC (APC-MNPs) were analyzed using Fourier transform infrared analysis (FT-IR) to verify their chemical structure. The APA-MNPs and APC-MNPs were also analyzed using X-ray powder diffraction (XRD) to analyze the crystal lattice structure; Dynamic Light Scattering (DLS) to determine the particle size, dispersity index, and zeta potential; Thermogravimetric Analysis (TGA) to measure thermal stability; a Drop Shape Analyzer to determine contact angle; High Resolution Transmission Electron Microscopy (TEM) to confirm surface morphology; and a Vibrating Sample Magnetometer (VSM) to measure their magnetic parameters.

Example 1

Preparation of Plant Extract

The plant *Anthemis pseudocotula* is a member of the genus *Anthemis* from the Compositae family that grows widely in different regions of Saudi Arabia. This plant is a semi-prostrate, densely annual herb with bright, dark green, feathery leaves and white flowers. The aerial parts of *Anthemis pseudocotula* were collected from a wild area of Rowdah Khuraim during March 2016 and identified by a taxonomist in the herbarium division of King Saud University. A plant extract was prepared by collecting the aerial parts and chopping these fresh plant parts into small pieces. The chopped plant part pieces were then air-dried in a shaded location. The dried plant material was extracted three times for 72 hours using saturated alkane (C6-C10), and the resulting organic extract was set aside. The remaining material was then dried again at room temperature and further extracted by (mono, di or tri) chloromethane at 25 degrees Celsius, producing a further organic extract. The organic extracts were filtered and concentrated under reduced pressure and temperature. The n-alkane organic extract was termed *Anthemis pseudocotula* Alkane Extract (APA), while the chloromethane extract was termed *Anthemis pseudocotula* Chloromethane Extract (APC).

Example 2

Biosynthesis of Magnetic Nanoparticles (MNPs)

The metal nanoparticles were prepared by co-precipitation. Ferric chloride hexahydrate and ferrous chloride tetrahydrate are dissolved in 100 mL of deionized water at a molar ratio between 1:1 and 1:5. In this case, between 6 grams and 10 grams of ferric chloride hexahydrate and between 2 grams and 5 grams of ferrous chloride tetrahydrate were dissolved in 100 mL of deionized water. This solution was then stirred with an extract solution (about 1 to 4 grams of either the APA concentrated extract or the APC concentrated extract dissolved in 100 mL of ethanol). Ammonia is then added dropwise with continuous stirring at about 25°-70° C. The pH was adjusted to between 8 and 11, and the solution was stirred for a further 1-6 hours to ensure homogenization and completion of the reaction. The resulting APA-MNPs and APC-MNPs were easily separated using an external magnetic field. The MNPs were washed several times with ethanol, followed by deionized water. The washed MNPs were then dried at room temperature, thereby producing magnetic nanoparticles (magnetite, or $Fe_3O_4$) capped or surface-coated by the hydrophobic plant extracts. The magnetic nanoparticles may be ferromagnetic, paramagnetic, or ferrimagnetic.

Example 3

Characterization of the Capped Magnetic Nanoparticles

The active functional groups in the APC and APA solutions as well as the APA-MNPs and the APC-MNPs were investigated by FT-IR (Nexus 6700 model FTIR), the spectra of which are shown in FIGS. 1A-1D. In the spectra of APA and APC, FIGS. 1A and 1B respectively, the presence of aliphatic groups ($CH_3$— and —$CH_2$—) was confirmed by the appearance of bands at 2933, 2856, 1453, and 1460 $cm^{-1}$, which refer to aliphatic C—H stretching and bending vibrations. The appearance of bands at 3413 and 1733 $cm^{-1}$ refer to the presence of polar functional groups OH and C═O stretching, respectively. The appearance of another band in APC (FIG. 1B) at 2364 $cm^{-1}$ may be attributed to the presence of amide.

In the FT-IR spectra of the APA-MNPs and APC-MNPs (FIGS. 1C and 1D), new bands appeared at 572 $cm^{-1}$ (Fe—O stretching). The appearance of these bands without any other new bands indicated the formation of pure MNPs. The appearance of different bands, such as broad bands at 3460 $cm^{-1}$, 1734 $cm^{-1}$, and 1654 $cm^{-1}$, which refer to carboxylic, hydroxyl, and carbonyl groups (ester and amide) stretching vibrations, indicated the functionalization of the MNPs with these functional groups from the APA and APC extract components. The shifts in the band positions and the decreasing intensity of these functional groups indicated the functionalization of these groups with MNPs. The increase in the intensity of the band at 572 $cm^{+1}$ for the capped MNPs in both samples indicated an increase in the concentration of the MNPs.

Figure 2A:
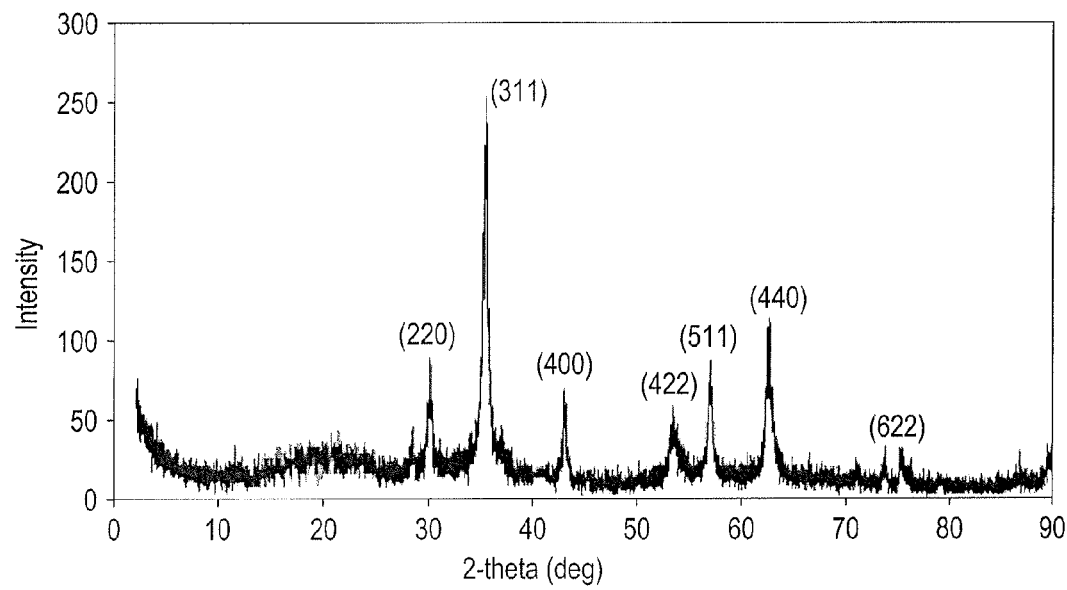
FIG. 2A is an X-ray diffraction spectrum (diffractogram) of the APA-MNPs.
Figure 2B:
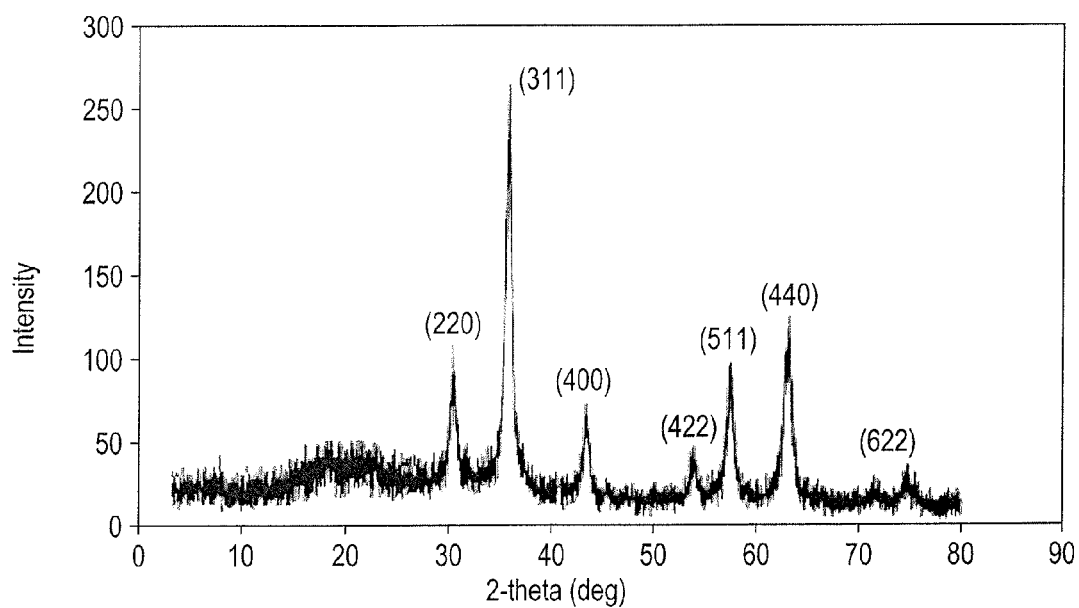
FIG. 2B is an X-ray diffraction spectrum of the APC-MNPs.

The formation of MNPs and their interactions with APA and APC were also confirmed using XRD powder diffractograms (BDX-3300 diffractometer using CuKa radiation of wavelength $\lambda$=1.5406 Å), as shown in FIGS. 2A and 2B, respectively. These diffractograms showed several characteristic peaks at 2θ values of 30.130 (220), 35.48° (311), 43.15° (400), 53.95° (422), 57.03° (511), 62.62° (440), and 74.52° (622). These peaks confirmed that the crystal structure of the MNPs was not affected by modification of their surfaces by the APC and APA components. The broad diffraction peaks appearing at 22.1° were attributed to the APA and APC components. The formation of magnetic nanospheres was confirmed by the presence of an intense and broad peak at 35.48° due to capping with the APC and APA extracts.

Figure 3:
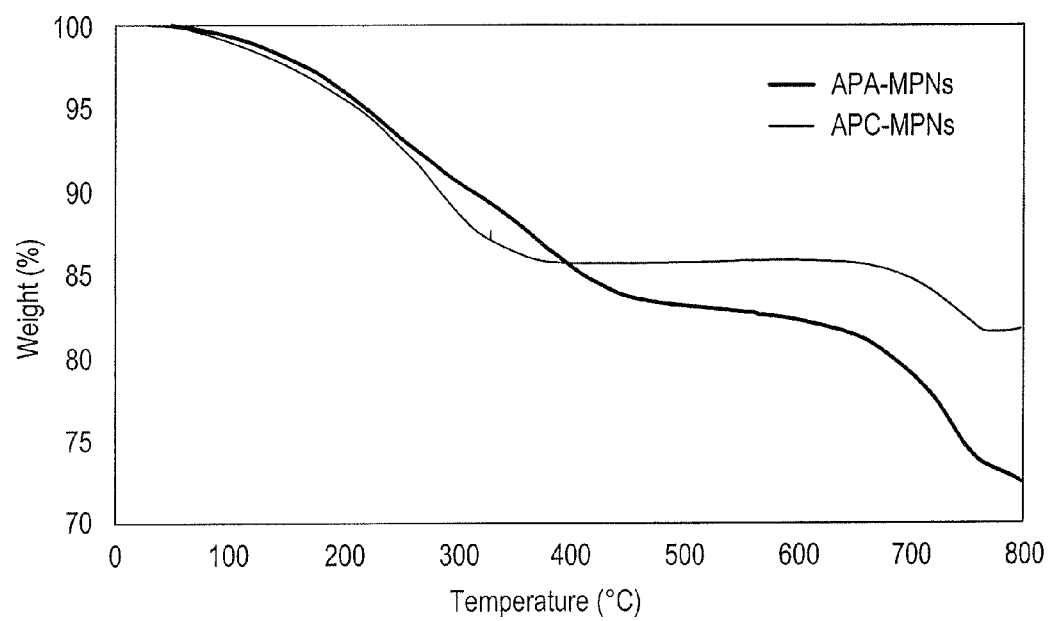
FIG. 3 is a TGA (thermogravimetric analysis) comparing the TGA curves of APA-MNPs and APC-MNPs.

The concentration of the MNPs incorporated with biomolecules in the APC and APA extracts was determined using a TGA thermogram (FIG. 3) (Shimadzu DSC-60, heating the MNPs from 25° C. to 800° C. under $N_2$ atmosphere at a heating rate of 10° C./min). Initially, weight loss under 100° C. refers to contained water in the MNP samples. The degradation process takes place in two regions, at temperatures ranging from 100 to 400° C. and at 670-780° C. In the first region (100-400° C.), the APA-MNPs and APC-MNPs lost 14 and 15%, respectively, of their initial weight. The degradation in this region is caused by the decomposition of components of the APA and APC. The weight losses in the second region were 10% and 3.5% for the APA-MNPs and APC-MNPs, respectively. The high stability of APC-MNPs between 400-700° C. might reflect stronger interactions between the relatively polar components of APC compared with those of APA. The magnetic contents of APA-MNPs and APC-MNPs were 72.5 and 81.5%, respectively, as determined at 800° C. This indicated that there was a higher amount of capping agent on the APA-MNPs than on the APC-MNPs.

Figure 4A:
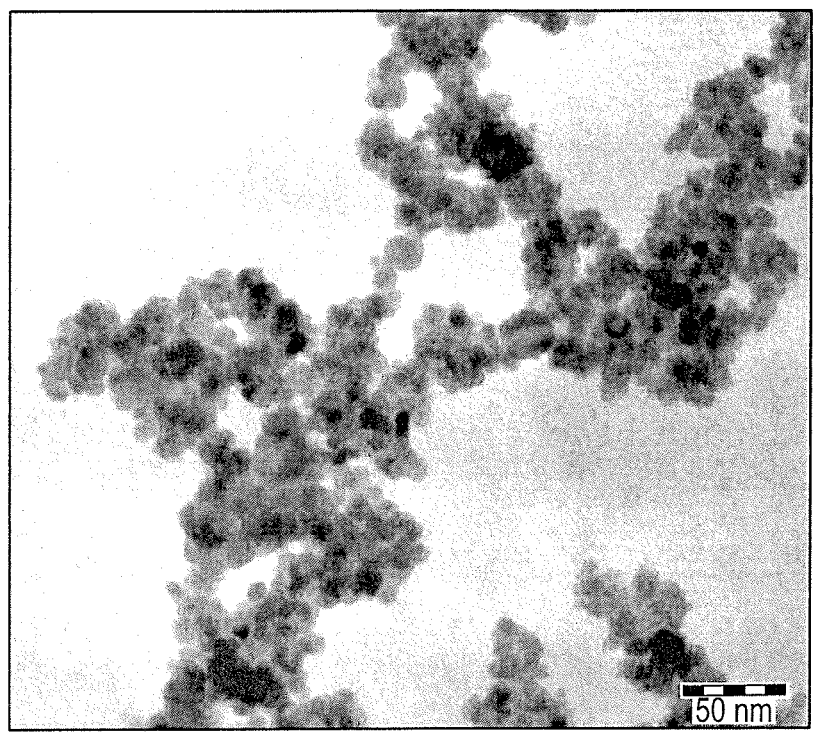
FIG. 4A is a TEM micrograph of the APA-MNPs.
Figure 4B:
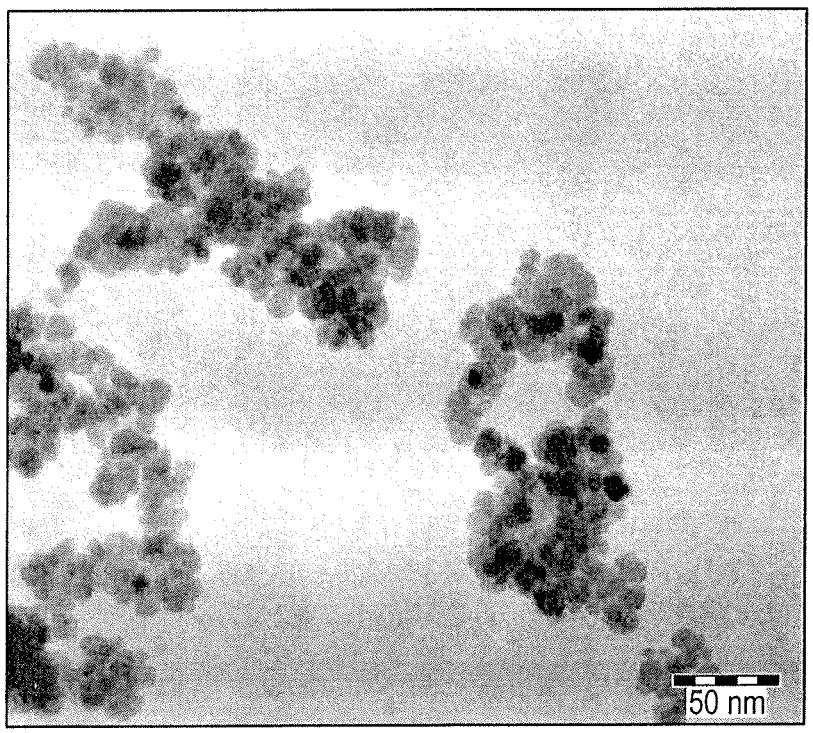
FIG. 4B is a TEM micrograph of the APC-MNPs.

The surface morphologies of the synthesized APA-MNPs and APC-MNPs were determined by transmission electron microscopy (TEM) (HR-TEM using JEOL JE-2100F). As shown in FIGS. 4A and 4B, in the TEM micrographs, the average diameter of the formed MNPs is about 9.4±3 nm, with an irregular spherical shape. MNPs appeared in clusters because of their magnetic nature.

Figure 5A:
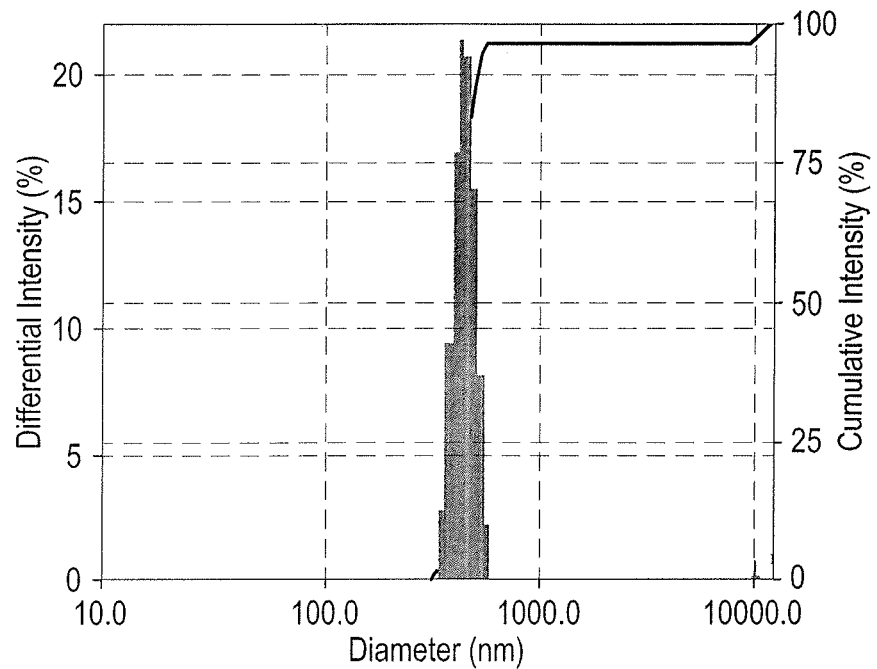
FIG. 5A is a chart showing particle size distribution for APA-MNPs as determined by Dynamic Light Scattering (DLS).
Figure 5B:
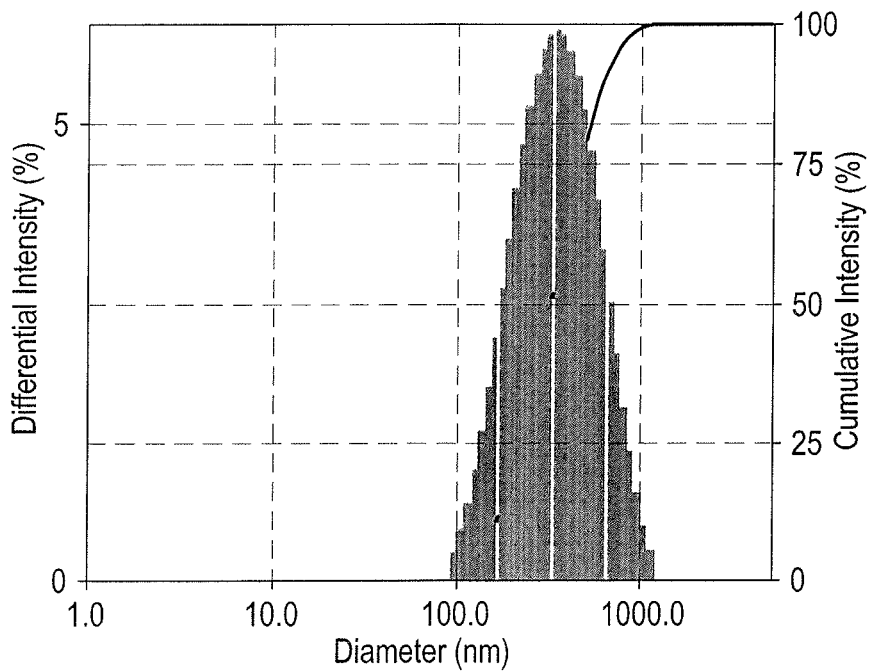
FIG. 5B is a chart showing particle size distribution for APC-MNPs as determined by Dynamic Light Scattering (DLS).

DLS measurements (Zetasizer 3000HS from Malvern Instruments, Malvern, U.K.) were applied to determine the diameter and dispersity of the synthesized APA-MNPs and APC-MNPs in ethanol (FIGS. 5A and 5B). The average diameter and polydispersity index (PDI) of the APA-MNPs and APC-MNPs in ethanol were 565.1 nm and 0.338, and 308.8 nm and 0.229, respectively. The considerable difference in the diameter measured by TEM and DLS reflects the inclusion of agglomerated regions. It was noted that the APA-MNPs were more agglomerated than the APC-MNPs, which might be caused by Van der Waals force attractions between the hydrophobic surfaces of these particles. These results supported the TGA analysis.

The charge on the surface of the synthesized MNPs was evaluated using zeta potential measurements. The zeta potential of the APC-MNPs had a more negative value (−37.14 mV) than that of the AHP-MNPs (−6.53 MV), which indicated higher dispersity and stability of the APC-MNPs in ethanol compared with the APA-MNPs. These data confirmed the particle size and TEM results.

Increasing the dispersity of MNPs in crude oil increases their efficiency in the collection of an oil spill. The dispersion of MNPs in crude oil depends on the hydrophobicity of the capping agent. The hydrophobicity of the synthesized MNPs was determined using the contact angle. The synthesized MNPs showed no dispersion in seawater and high dispersion in toluene, xylene, chloroform, and other low polar solvents. The contact angles of APA-MNPs and APC-MNPs were 142° and 118°, respectively, which reflects the higher hydrophobic contents of the APA extract compared with the APC extract.

The magnetic properties of the synthesized MNPs, represented by the saturation magnetization ($M_s$), magnetic remanence ($M_r$), and coercivity ($H_c$), were determined at room temperature by VSM magnetic hysteresis loops and are shown in Table 1. The magnetization curve showed that the APA-MNPs and APC-MNPs behaved as supermagnetic materials because of the increased value of $M_s$ and the decreased values of $M_r$ and $H_c$ compared to other MNPs capped by different biocomponents. The increase in the Ms value of APC-MNPs reflected their lower amount of capping agent compared with APA-MNPs, which was confirmed by the TGA analysis.

TABLE 1

Magnetic parameters of APA-MNPs and APC-MNPs at 25° C.

| Sample | Ms (emu/g) | Mr (emu/g) | Hc (Oe) |
|---|---|---|---|
| APA-MNPs | 51.42 | 0.153 | 6.4 |
| APC-MNPs | 57.83 | 0.098 | 5.1 |

Example 4

Oil Collection by APA-MNPs and APC-MNPs

The efficiency of APA-MNPs and APC-MNPs in the collection of an oil spill of Arabian heavy crude oil was evaluated at different MNP to crude oil ratios (1:1 to 1:25), and are listed in Table 2. In a 500 mL beaker, 1 mL of Saudi heavy crude oil was poured over 250 mL of seawater. Different ratios of MNPs to crude oil, ranging from 1:1 to 1:25, were added and mixed slowly with the crude oil over the seawater for 1 minute, using a glass rod. After 5 minutes, a permanent Nd—Fe—B magnet (4300 Gauss) was used to collect the dispersed crude oil spill. The remaining oil was extracted from seawater by using chloroform. The efficiency of the MNPs in the collection of the oil spill was calculated using the following equation:

$$CE(\%) = \frac{V0}{V1} \times 100,$$

where V0 and V1 are the volume of removed oil and the original spill, respectively. The used MNPs were recycled after collecting them using an external magnetic field and washing them several times with chloroform.

The best ratio of APA-MNPs oil, which succeeded in removing 90% of the crude oil, was (1:10). APA-MNPs demonstrated highly efficient removal of crude oil, and performed better than APC-MNPs. The high efficiency of APA-MNPs might reflect the greater hydrophobicity of the capping agent, which increased its dispersion in crude oil, as shown by the contact angle data. Therefore, the efficiency of MNPs in the collection of oil spill could be improved by increasing the hydrophobicity of the capping agents for these nanoparticles. It was also observed that the removal efficiency was not improved significantly by increasing the ratio of MNPs:oil to 1:1 because the MNPs aggregated and formed clusters that disturbed the magnetic attraction between the MNPs and the external magnetic field.

TABLE 2

Oil spill collection results

| Sample | Ratio | | | |
|---|---|---|---|---|
| | 1:1 | 1:10 | 1:25 | 1:50 |
| APA-MNPs | 92% | 90% | 88% | 83% |
| APC-MNPs | 81% | 78% | 74% | 70% |

Figure 6:
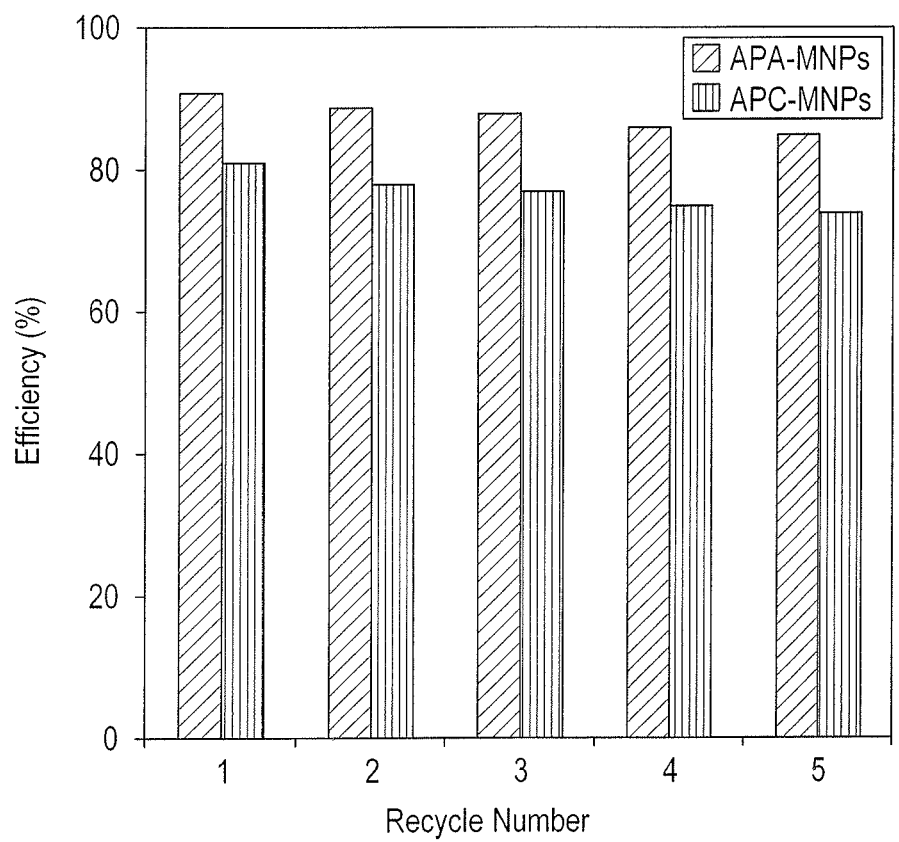
FIG. 6 is a plot of percent efficiency as a function of recycle number for APA-MNPs and APC-MNPs.

Finally, the reusability of the synthesized MNPs in the collection of oil spill was tested five times. After collection of the oil using an external magnetic field, the MNPs were washed with chloroform, followed by washing with ethanol, air-dried, and then used directly for the next run without further purification. The results for the recovered MNPs are presented in FIG. 6. The results showed that the efficiency of the recovered particles in the collection of the oil spill decreased slightly with increasing numbers of recovery cycles It is to be understood that the biosynthesized magnetic metal nanoparticles for oil spill remediation are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of biosynthesizing magnetic metal nanoparticles for oil spill remediation, comprising the step of co-precipitating magnetic nanoparticles in a solution containing an extract of *Anthemis pseudocotula*.

2. The method of biosynthesizing magnetic metal nanoparticles according to claim 1, wherein the solution containing an extract of *Anthemis pseudocotula* comprises ethanol having a concentrated extract of *Anthemis pseudocotula* dissolved therein.

3. The method of biosynthesizing magnetic metal nanoparticles according to claim 2, wherein said concentrated extract comprises *Anthemis pseudocotula* extracted in an n-alkane.

4. The method of biosynthesizing magnetic metal nanoparticles according to claim 2, wherein said concentrated extract comprises *Anthemis pseudocotula* extracted in a low polar solvent selected from the group consisting of mono-chloromethane, dichloromethane, and trichloromethane.

5. The method of biosynthesizing magnetic metal nanoparticles according to claim 1, wherein said co-precipitating step comprises the steps of:
dissolving a concentrated extract of *Anthemis pseudocotula* in ethanol;
dissolving ferric chloride and ferrous chloride in deionized water in a molar ratio between 1:1 and 5:1 to form a precursor solution;
adding the precursor solution to the extract of *Anthemis pseudocotula* in ethanol to form a reaction mixture;
adding a 25% solution of ammonium hydroxide to the reaction mixture dropwise with continuous stirring at a temperature between 25° C. and 70° C. until the pH is between 8 and 11; and
stirring the reaction mixture for between 1 and 6 hours.

6. The method of biosynthesizing magnetic metal nanoparticles according to claim 5, wherein said concentrated extract comprises an n-alkane extract of *Anthemis pseudocotula*.

7. The method of biosynthesizing magnetic metal nanoparticles according to claim 5, wherein said concentrated extract comprises *Anthemis pseudocotula* extracted into a solvent selected from the group consisting of mono-chloromethane, dichloromethane, and trichloromethane.

8. The method of biosynthesizing magnetic metal nanoparticles according to claim 5, further comprising the steps of:
collecting aerial parts of *Anthemis pseudocotula* plants; and
extracting the aerial parts in a low polar extraction solvent to obtain the extract of *Anthemis pseudocotula*.

9. The method of biosynthesizing magnetic metal nanoparticles according to claim 8, further comprising the steps of chopping and air-drying the aerial parts in shade prior to the step of extracting the aerial parts.

10. The method of biosynthesizing magnetic metal nanoparticles according to claim 8, wherein said low polar extraction solvent comprises an n-alkane solvent.

11. The method of biosynthesizing magnetic metal nanoparticles according to claim 8, wherein said low polar extraction solvent comprises into a solvent selected from the group consisting of mono-chloromethane, dichloromethane, and trichloromethane.

12. The method of biosynthesizing magnetic metal nanoparticles according to claim 8, wherein said step of extracting the aerial parts is performed at 25° C.

13. The method of biosynthesizing magnetic metal nanoparticles according to claim 8, further comprising the step of concentrating the extract under reduced temperature and pressure.

14. A magnetic metal nanoparticle composition for oil spill remediation comprising magnetic nanoparticles capped with an extract of *Anthemis pseudocotula*.

15. The magnetic metal nanoparticle composition according to claim 14, wherein said magnetic nanoparticles include iron in an $Fe^{3+}:Fe^{2+}$ oxidation state molar ratio between 1:1 and 5:1.

16. The magnetic metal nanoparticle composition according to claim 14, wherein said extract of *Anthemis pseudocotula* comprises an extract of *Anthemis pseudocotula* into an n-alkane solvent.

17. The magnetic metal nanoparticle composition according to claim 14, wherein said extract of *Anthemis pseudocotula* comprises an extract of *Anthemis pseudocotula* into an extraction solvent selected from the group consisting of mono-chloromethane, dichloromethane, and trichloromethane.

18. A method of oil spill remediation, comprising the steps of:
contacting an oil spill with magnetic nanoparticles capped with an extract of *Anthemis pseudocotula* in order to adsorb the oil onto the magnetic nanoparticles; and
applying a magnetic field to collect the magnetic nanoparticles with the adsorbed oil.

19. The method of oil spill remediation according to claim 18, wherein said step of contacting an oil spill further comprises contacting the oil spill with magnetic nanoparticles in a nanoparticles:oil ratio of 1:10 by weight.

20. The method of oil spill remediation according to claim 18, further comprising the steps of:
washing the collected magnetic nanoparticles with the adsorbed oil in chloroform;
thereafter, washing the collected magnetic nanoparticles in ethanol; and
re-using the washed magnetic nanoparticle to adsorb additional oil from the oil spill.

* * * * *